United States Patent [19]

Kao

[11] Patent Number: 5,394,333
[45] Date of Patent: Feb. 28, 1995

[54] CORRECTING GPS POSITION IN A HYBRID NAVIATION SYSTEM

[75] Inventor: Wei-Wen Kao, Fremont, Calif.

[73] Assignee: Zexel USA Corp., Fort Worth, Tex.

[21] Appl. No.: 170,405

[22] Filed: Dec. 20, 1993

Related U.S. Application Data

[63] Continuation of Ser. No. 811,742, Dec. 23, 1991, abandoned.

[51] Int. Cl.⁶ ............................................. G06F 15/50
[52] U.S. Cl. ................................. 364/450; 364/449; 364/454; 364/444; 364/453; 364/424.02; 364/424.01; 342/357; 340/990; 340/995
[58] Field of Search ........................ 364/424.02, 424.05, 364/424.01, 444, 436, 456, 450, 449, 453, 454, 457; 342/357, 457; 340/990, 995

[56] References Cited

U.S. PATENT DOCUMENTS

| | | | |
|---|---|---|---|
| 3,636,323 | 1/1972 | Salisbury et al. | 364/453 |
| 4,633,407 | 12/1986 | Freienstein et al. | 364/450 |
| 4,727,492 | 2/1988 | Reeve et al. | 364/450 |
| 4,731,613 | 3/1988 | Endo et al. | 364/450 |
| 4,758,959 | 7/1988 | Thoone et al. | 364/454 |
| 4,847,769 | 7/1989 | Reeve | 364/424.02 |
| 4,897,792 | 1/1990 | Hosoi | 364/449 |
| 4,899,285 | 2/1990 | Nakayama et al. | 364/453 |
| 4,954,959 | 9/1990 | Moroto et al. | 364/449 |
| 5,046,011 | 9/1991 | Kakihara et al. | 364/449 |
| 5,075,693 | 12/1991 | McMillan et al. | 342/457 |
| 5,075,864 | 12/1991 | Sakai | 364/450 |
| 5,184,303 | 2/1993 | Link | 364/449 |

*Primary Examiner*—Kevin J. Teska
*Assistant Examiner*—Jacques Harold Louis-Jacques
*Attorney, Agent, or Firm*—Harold L. Burstyn; Thomas R. Morrison

[57] ABSTRACT

A hybrid vehicle navigation system employs both GPS and dead reckoning sensors, working in parallel, to produce a sensed and a calculated position, respectively. The sensed and the calculated positions are compared to a road data base to determine separate correction factors required to correct the sensed and the calculated positions. In one embodiment, the system employs either the sensed or calculated position for navigation depending on which has the smaller correction factor.

7 Claims, 3 Drawing Sheets

CORRECTING GPS POSITION IN A HYBRID NAVIGATION SYSTEM

This is a continuation of application Ser. No. 07/811,742, filed Dec. 23, 1991, now abandoned.

BACKGROUND OF THE INVENTION

The present invention relates to vehicle navigation systems and, more particularly, to vehicle navigation systems that employ positioning data from the Global Positioning System (GPS) as an input.

Use of the Global Positioning System ("GPS") has been a principal method for vehicle navigation systems to sense an absolute position of the vehicle. However, the accuracy of GPS suffers from the current incomplete coverage of its satellites, from problems of multiple path reflections, and from artificial accuracy degradation caused by the so-called Selective Availability that results from military control of GPS. Experience demonstrates that, although the root-mean-square (RMS) error of GPS is generally 30 meters, transient errors of up to several hundred meters are not unknown.

The error in a position found from GPS can be divided into two components. The first component is the short-term effect caused by the temporary interference of buildings or trees with line-of-sight transmission from satellites. The second component is the long-term effect caused by poor satellite geometry.

Many current vehicle navigation systems use GPS as one part of a hybrid system. The other part uses dead-reckoning sensors to verify the validity of GPS signals. When GPS signals are determined to be unreliable, a switching algorithm switches the system to positions determined by dead reckoning and ignores GPS positions. Conversely, when the signals from GPS are determined to be valid, GPS positions alone are used and dead-reckoning positions are ignored.

Hitherto hybrid navigation systems have largely confined themselves to detecting problems with positions from GPS rather than to correcting them when detected. Most systems simply switch to another source of positioning information if they determine that GPS positions are unreliable. However, there is no guarantee that the reference source is any more reliable than GPS. The reference source may be in error, or both it and GPS may be in error.

U.S. Pat. No. 4,837,700 discloses a system wherein an odometer is used to determine whether the vehicle is stopped. If the vehicle is stopped, its average GPS position is processed to reset the vehicle's location.

U.S. Pat. No. 4,899,285 discloses a system that compares GPS positions and signal characteristics with those from dead-reckoning sensors. If the GPS position is determined to be reliable, it is used to reset the dead-reckoning position.

U.S. Pat. No. 4,899,285 discloses a similar system. Vehicle velocity and/or acceleration generated from GPS position measurements is compared with dead reckoning. If the comparison shows them to give similar results, the GPS position is used. If not, the dead-reckoning position is used.

However, the error in GPS positioning caused by poor satellite geometry usually varies slowly over time. The result is an offset in the GPS position that also varies slowly over time. Such an offset cannot in general be detected by checking the difference in heading, velocity, or acceleration between the GPS and the dead-reckoning sensors.

Moreover, the dead-reckoning position itself is calculated by integrating the relative displacement vectors generated by the dead-reckoning sensors. Hence the accumulation of errors over time cannot be avoided. Therefore dead-reckoning positions are not absolutely accurate, and there is no way to choose which positioning source, GPS or dead reckoning, is in error. In most cases both are.

Thus the only absolute positioning available to a navigation system comes from a database of roads. Most road databases are digitized from highly accurate maps, from aerial photographs, or from ground surveys. Their margin of error can be as close as 50 feet, so that much greater accuracy is available from a road database than from the 100 feet root-mean-square error and several hundred meters transient error of GPS.

OBJECTS AND SUMMARY OF THE INVENTION

An object of the present invention is to provide a hybrid vehicle navigation system that overcomes the drawbacks of the prior art.

A further object of the present invention is to make simultaneous use of dead reckoning and GPS positions to improve the accuracy of vehicle positioning in a hybrid navigation system.

Still a further object of the present invention is to improve the accuracy of GPS positions by means of matching them to a map drawn from a database of roads.

Briefly stated, the present invention provides a hybrid vehicle navigation system employing both GPS and dead reckoning sensors, working in parallel, to produce a sensed and a calculated position, respectively. The sensed and the calculated positions are compared to a road data base to determine separate correction factors required to correct the sensed and the calculated positions. In one embodiment, the system employs either the sensed or calculated position for navigation depending on which has the smaller correction factor.

According to an embodiment of the invention, there is provided a hybrid vehicle navigation system comprising: means for determining a position of the vehicle from a Global Positioning System, means for comparing the vehicle position with a location selected from a plurality of candidate vehicle positions in a database, means for computing a correction factor that, when used to correct the vehicle position, makes the vehicle position correspond to the location, and means, based on the correction factor and the Global Positioning System, for correcting the vehicle position.

According to a feature of the invention, there is provided a method for improving the reliability of a vehicle position determined from the Global Positioning System which comprises the steps of: determining a sensed vehicle position from a Global Positioning System, comparing the sensed vehicle position with a location selected from a plurality of vehicle positions in a database, and computing a correction factor that, when used to correct the sensed vehicle position, makes a corrected vehicle position correspond to the location.

According to a further feature of the invention, there is provided apparatus for improving the reliability of a vehicle position determined from the Global Positioning System, which comprises: a Global Positioning System receiver for receiving signals from transmitters of a Global Positioning System, means for transforming the signals into the vehicle position, the means for transforming further including means for comparing the vehicle position with a location selected from a plurality of vehicle positions in a database, and means for determining a correction factor that, when used to correct the vehicle position, makes a corrected vehicle position correspond to the selected location.

According to a still further feature of the invention, there is provided apparatus for determining a location of a vehicle comprising: means, responsive to a Global Positioning System, for determining a sensed position of said vehicle; means, responsive to dead reckoning sensors, for determining a calculated position of said vehicle; first comparison means for comparing said calculated position with a map database and for choosing therefrom a map-matched position of said vehicle; second comparison means for comparing said sensed position with said map-matched position and for producing a correction factor effective to produce a zero difference between said map-matched position and said sensed position; and means for using said correction factor to correct said sensed position.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
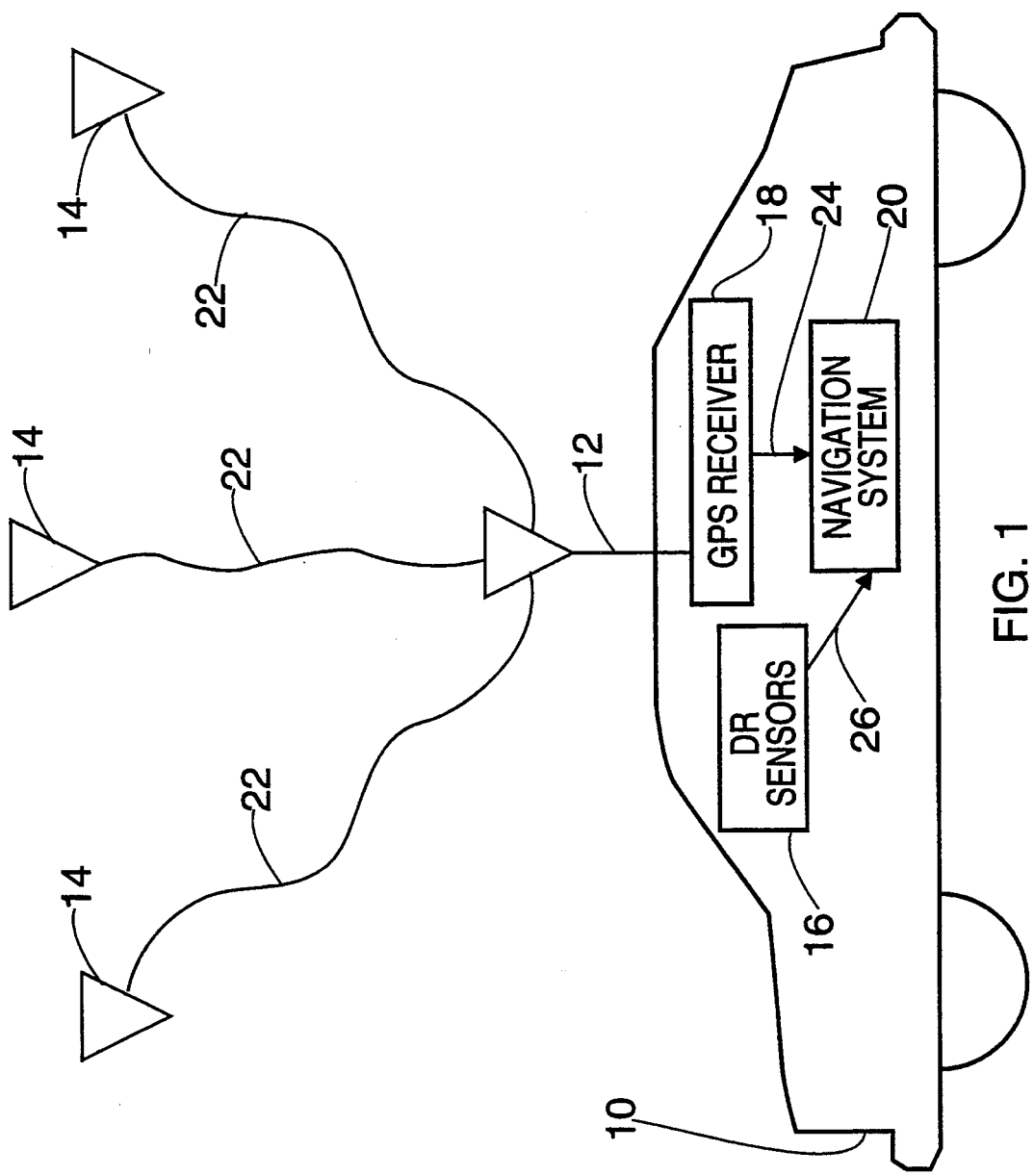
FIG. 1 is a general view of a vehicle equipped with a hybrid navigation system.

Referring to FIG. 1, a vehicle 10 moves along a road. Aboard vehicle 10 is an antenna 12 that receives signals from a plurality of GPS satellites 14. Vehicle 10 is also provided with dead reckoning sensors 16, a GPS receiver 18, and a navigation system 20. Signals 22 from satellites 14, received by antenna 12, are sent to GPS receiver 18, which calculates a GPS position 24 from them and transmits it to navigation system 20. Also available to navigation system 20 is a dead-reckoning position 26 from dead reckoning sensors 16.

GPS receiver 18 is a commercially available unit for which a fuller description is not considered to be needed. Dead-reckoning sensors 16 may include one or more conventional devices including, for example, a tachometer, a compass, an inertial sensor, or a steering-wheel angular sensor. In addition to existing types of sensors, the invention should be construed to include types of dead reckoning sensors which may be unknown at the time of filing of the present application but which may be developed in the future.

Figure 2:
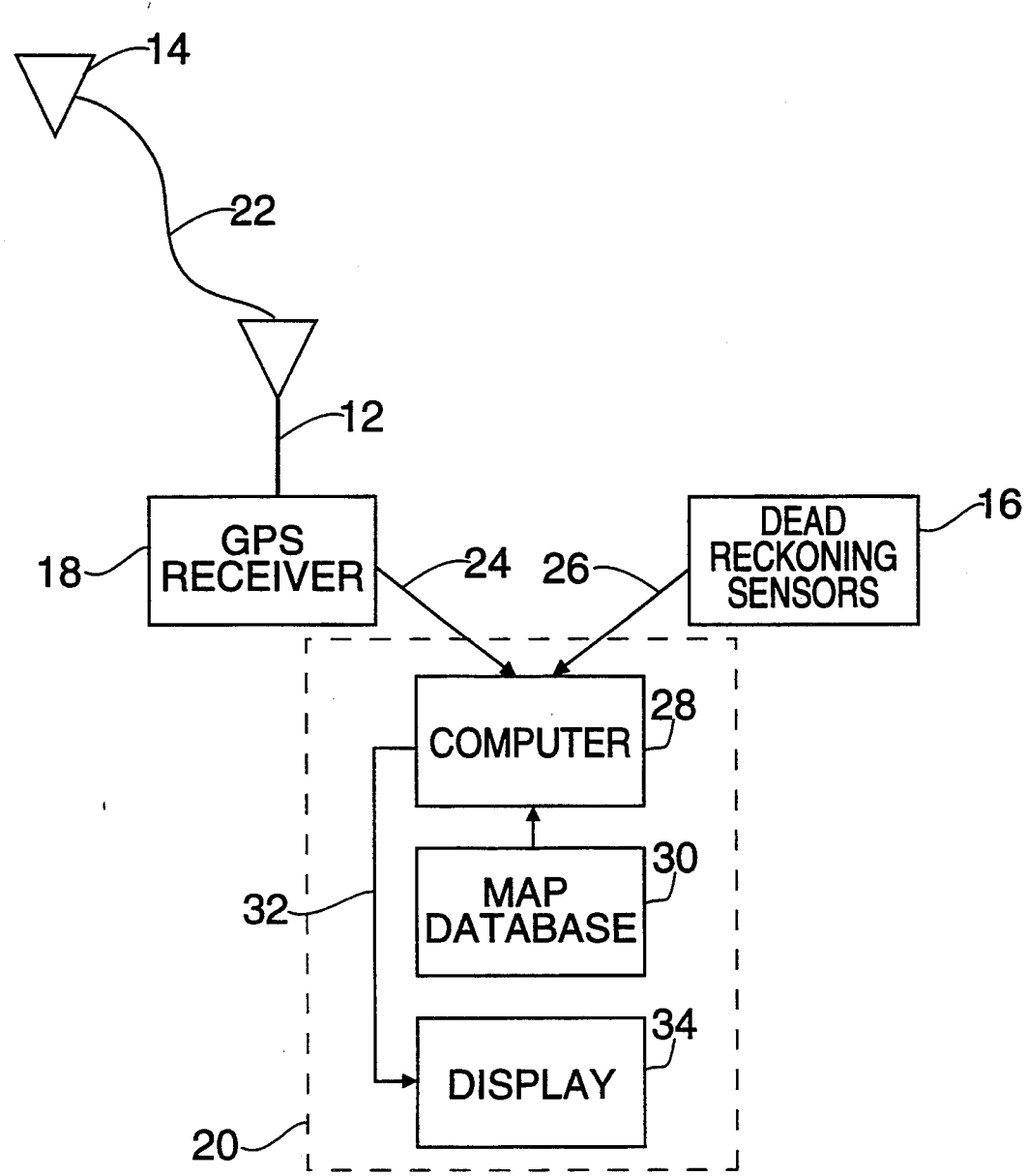
FIG. 2 is a schematic view of the path of signals through the navigation system and associated units.

Referring to FIG. 2, a computer 28, a component of navigation system 20, receives GPS position 24 and reconciles it with dead-reckoning position 26. In accordance with the program whose flowchart is in FIG. 3, GPS position 24 is evaluated against a position drawn from map database 30 with the aid of dead-reckoning position 26. GPS position 24 is corrected by adding an offset calculated from the difference between GPS position 24 and the corresponding position from map database 30. Several iterations are performed until there is no discernible difference between GPS position 24 and the position from map database 30.

The calculated offset applied to GPS position 24 is an index of the reliability of the latter. Thus navigation system 20 can mix GPS position 24 and dead-reckoning position 26 to locate the position from map database 30, rather than having to choose between them. The weight to be given to each in the mix is measured by the offset. Mixing GPS position 24 and dead-reckoning position 26 to help determine a map-matched position gives a much smoother result than if either is used alone.

The resulting smoothed position 34 is continuously sent from computer 28 to a display 36 to assist the operator of vehicle 10.

Figure 3:
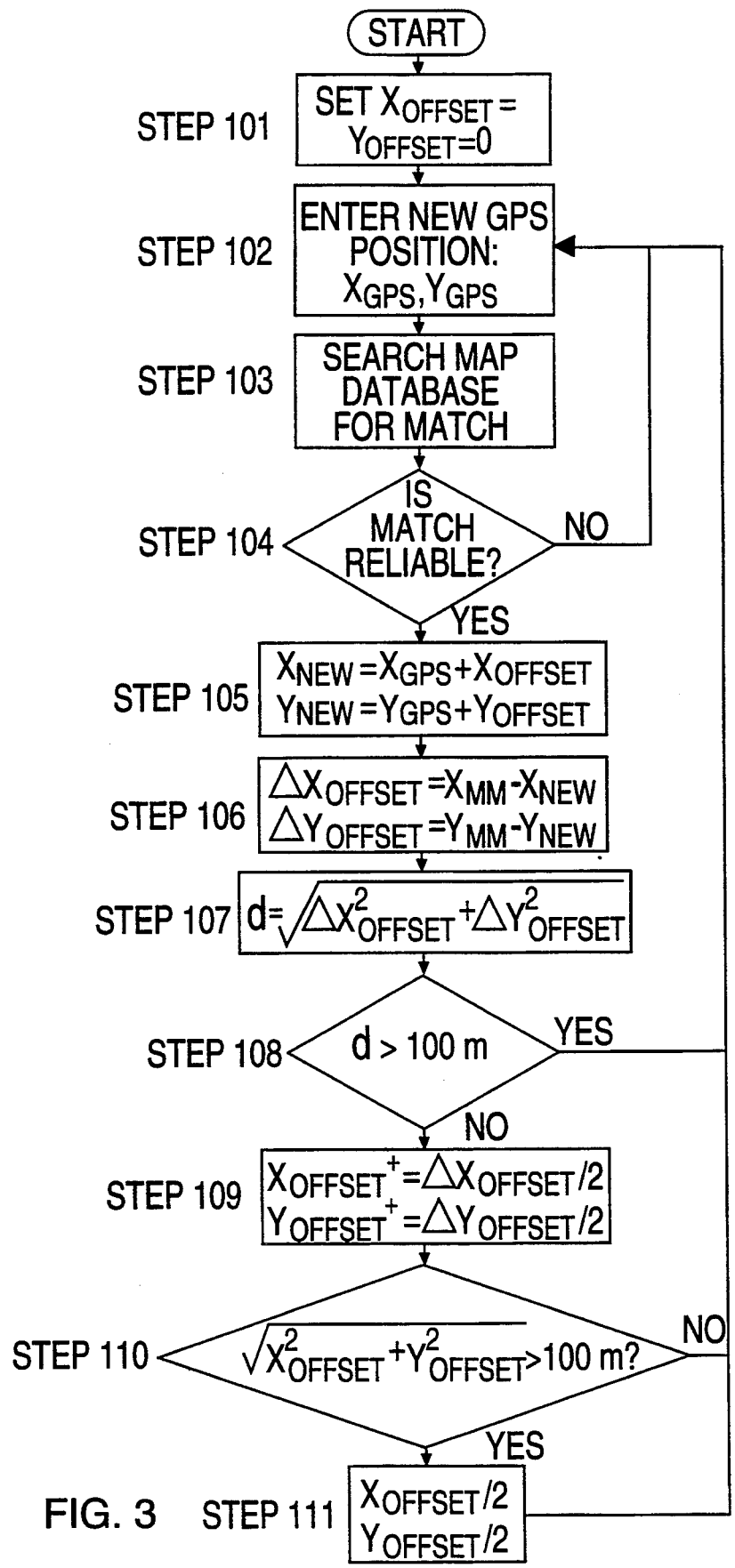
FIG. 3 is a flow chart that displays the steps by which the hybrid navigation system corrects a GPS position by map-matching to determine route guidance for a vehicle.

Referring to FIG. 3, after the program starts, the offset is initialized to zero (step 101) by setting its x and y coordinates to zero. Then a new GPS position, whose coordinates are $x_{GPS}$ and $y_{GPS}$, is entered (step 102). Map Database 30 is searched for a position whose coordinates match $x_{GPS}$ and $y_{GPS}$ (step 103). The reliability of this match is tested in step 104. If the match is unreliable, the program goes back to step 102 and enters a new GPS position.

If the match is reliable, a new position is calculated (step 105) with coordinates $x_{new}$ and $y_{new}$, where $$x_{new} = x_{GPS} + x_{offset}, \quad y_{new} = y_{GPS} + y_{offset}.$$

Though $x_{offset} = y_{offset} = 0$ on the initial pass, on subsequent passes the offset will in general not be zero.

Next the increment of the offset is calculated (step 106), by subtracting the coordinates of the new position from those of the map-matched position found in step 103, and the root-mean-square value d of this increment determined (step 107). The reliability of the new GPS position found in step 105 is determined (step 108) by calculating whether or not $d > 100$ meters. If it is, the new GPS position is discarded and the program returns to step 102 to get a new one.

If step 108 shows that the new GPS position is reliable, a new increment to the offset is calculated (step 109). If this new increment pushes the root-mean-square value of the new offset beyond 100 meters (step 110), then the offset is halved (step 111) before the program returns to step 102 for a new GPS position. The program terminates only when navigation system 20 is shut down.

In the foregoing description, GPS is described as an existing satellite navigation system which employs radio signals from a plurality of satellites to determine the position of vehicle 10 on the surface of the earth. For the present invention, GPS can be considered to include any system, elements of which are located off vehicle 10, which provides means to determine the position of vehicle 10.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hybrid vehicle navigation system comprising:

means for determining a sensed position of said vehicle from a Global Positioning System;

means for determining a calculated position of said vehicle from at least one dead reckoning sensor;

means for comparing said sensed vehicle position and said calculated vehicle position with a location selected from a plurality of candidate vehicle positions in a map database containing pre-stored locations obtained from an external system;

means for computing a plurality of correction factors, one for each sensed position and one for each calculated position;

said means for computing being effective for choosing one of said plurality of correction factors that, when used to correct said vehicle position, makes said vehicle position correspond to said location; and means, based on said selected correction factor and an associated one of said sensed position and said calculated position, for correcting said vehicle position.

2. Apparatus according to claim 1, wherein said means for comparing is a microcomputer.

3. A hybrid vehicle navigation system as in claim 1, wherein a means is provided to further improve a reliability of said system by performing sequential iterations with decreasing increments in said correction factor, minimizing an error in matching one of said sensed position and calculated position to said selected map database location.

4. A method for improving the reliability of a vehicle position determined from the Global Positioning System which comprises the steps of:

determining a sensed vehicle position from a Global Positioning System;

determining a calculated vehicle position from at least one dead reckoning sensor;

comparing said sensed vehicle position and said calculated vehicle position with a location selected from a plurality of vehicle positions in a map database containing pre-stored locations obtained from an external system;

computing a plurality of correction factors, one for each sensed position and one for each calculated position; and selecting from said plurality one correction factor that, when used, makes a corrected vehicle position correspond to said location.

5. Apparatus for improving the reliability of a vehicle position determined from the Global Positioning System, which comprises:

a Global Positioning System receiver for receiving signals from transmitters of a Global Positioning System;

dead reckoning sensors for determining calculated positions;

means for transforming said signals into said sensed vehicle position and outputs from said sensors into said calculated vehicle position respectively;

said means for transforming further including means for comparing said sensed vehicle position and said calculated vehicle position with a location selected from a plurality of vehicle positions in a map database containing prestored positions obtained from an external system;

means for determining a plurality of correction factors, one for each sensed position and one for each calculated position; and means for selecting one correction factor that, when used, makes a corrected vehicle position correspond to said selected location.

6. Apparatus for determining a location of a vehicle comprising:

means, responsive to a Global Positioning System, for determining a sensed position of said vehicle;

means, responsive to dead reckoning sensors, for determining a calculated position of said vehicle;

first comparison means for comparing said calculated position with a map database containing pre-stored locations obtained from an external system and for choosing therefrom a map-matched position of said vehicle;

second comparison means for comparing said calculated position and said sensed position with said chosen map-matched position and for producing a plurality of correction factors, one for each calculated position and one for each sensed position;

means for averaging said plurality of correction factors to produce a smoothed correction factor effective to produce a zero difference between said map-matched position and said sensed position; and means for using said smoothed correction factor to correct said sensed position.

7. A hybrid vehicle navigation system comprising:

means for determining a sensed position of said vehicle from a Global Positioning System;

means for determining a calculated position of said vehicle by means of a dead reckoning sensor system;

a first comparison means for comparing said calculated position with a map database containing pre-stored locations obtained from an external system and for choosing therefrom a map-matched position of said vehicle;

a second comparison means for comparing said calculated position and said sensed position with said chosen map-matched position and for producing a plurality of correction factors for each of said calculated position and said sensed position;

means for averaging said plurality to produce a smoothed correction factor effective for producing a zero difference between said chosen map-matched position and said sensed position; and means for correcting said vehicle position based on said smoothed correction factor.

* * * * *

UNITED STATES PATENT AND TRADEMARK OFFICE
CERTIFICATE OF CORRECTION

PATENT NO.   : 5,394,333

DATED        : February 28, 1995

INVENTOR(S)  : Wei-Wen KAO

It is certified that an error appears in the above-identified patent and that said Letters Patent is hereby corrected as shown below:

Cover Page, Item [54], change "NAVIATION" TO --NAVIGATION--.

Column 1, line 2, change "NAVIATION" to --NAVIGATION--.

Signed and Sealed this

Seventh Day of November, 1995

Attest:

BRUCE LEHMAN

Attesting Officer          Commissioner of Patents and Trademarks